(12) United States Patent
Stahl

(10) Patent No.: US 10,235,887 B2
(45) Date of Patent: Mar. 19, 2019

(54) CONTROL SYSTEM AND METHOD FOR ASSISTING MOTOR VEHICLES IN SAFELY PULLING IN AFTER OVERTAKING

(71) Applicant: Lucas Automotive GmbH, Koblenz (DE)

(72) Inventor: Andreas Stahl, Damscheid (DE)

(73) Assignee: LUCAS AUTOMOTIVE GmbH (DE)

( * ) Notice: Subject to any disclaimer, the term of this patent is extended or adjusted under 35 U.S.C. 154(b) by 0 days.

(21) Appl. No.: 15/564,793

(22) PCT Filed: Apr. 1, 2016

(86) PCT No.: PCT/EP2016/057227
§ 371 (c)(1),
(2) Date: Oct. 6, 2017

(87) PCT Pub. No.: WO2016/162282
PCT Pub. Date: Oct. 13, 2016

(65) Prior Publication Data
US 2018/0114446 A1   Apr. 26, 2018

(30) Foreign Application Priority Data

Apr. 7, 2015   (DE) .......................... 10 2015 004 476

(51) Int. Cl.
*H04Q 9/00*      (2006.01)
*G08G 1/16*      (2006.01)
(Continued)

(52) U.S. Cl.
CPC .............. *G08G 1/167* (2013.01); *B60Q 9/008* (2013.01); *B60W 30/18163* (2013.01);
(Continued)

(58) Field of Classification Search
CPC ................................................... G08G 1/167
(Continued)

(56) References Cited

U.S. PATENT DOCUMENTS

| 5,521,579 A | 5/1996 | Bernhard | |
|---|---|---|---|
| 2008/0297177 A1* | 12/2008 | Dreyer | G01F 23/266 324/690 |
| 2014/0320320 A1* | 10/2014 | Wong | G08G 1/167 340/935 |

FOREIGN PATENT DOCUMENTS

| DE | 102005013669 | 9/2006 |
|---|---|---|
| DE | 102005016086 | 10/2006 |

(Continued)

*Primary Examiner* — Qutbuddin Ghulamali
(74) *Attorney, Agent, or Firm* — Tarolli, Sundheim, Covell & Tummino LLP

(57) ABSTRACT

The invention relates to a control system which is equipped and designed for use in a motor vehicle, to determine, on the basis of environment data obtained by one or several environment sensors present on the motor vehicle, a point in time as of which a safe lane change from a fast lane to an adjoining slower lane is possible. The environment sensors are designed to provide environment data representing the area laterally ahead of, laterally next to and/or laterally behind the vehicle to an electronic control unit of the control system. The control system is at least equipped and designed to determine, during a predefined interval or continuously, in the electronic control unit driving data representing the driving situation of one's own motor vehicle from sensors present in one's own motor vehicle. One or several other vehicles using the road laterally ahead of, laterally next to and/or laterally behind one's own motor vehicle are detected by means of the environment sensors during the predefined interval or continuously in order to determine characteristic variables relating to the driving situation(s) of the one or several other vehicles. On the basis of the driving data representing the driving situation of one's own vehicle and on the basis of the characteristic variables relating to the driving situation(s) of the one or several other vehicles, it is determined whether a safety-critical area laterally next to (Continued)

and/or laterally behind one's own motor vehicle is free of said other vehicle(s) and the finding is output optically, haptically and/or acoustically to the driver of one's own vehicle. The control system is equipped and designed to determine, on the basis of the driving data representing the driving situation of one's own vehicle and on the basis of the characteristic variables relating to the driving situation(s) of the one or several other vehicles. In the electronic control unit the point in time as of which a safe lane change is possible. This point in time is considered to be reached when the electronic control unit determines that a rear edge of one's own motor vehicle has gone past a front edge of the other vehicle and past a safety distance adapted to legal and/or physical conditions.

12 Claims, 1 Drawing Sheet

(51) Int. Cl.
*B60W 50/14* (2012.01)
*B60W 30/18* (2012.01)
*B60Q 9/00* (2006.01)
*H04L 29/08* (2006.01)

(52) U.S. Cl.
CPC ........... *B60W 50/14* (2013.01); *H04L 67/125* (2013.01); *H04Q 9/00* (2013.01); *B60W 2550/10* (2013.01); *B60W 2550/14* (2013.01); *B60W 2550/30* (2013.01); *B60W 2550/308* (2013.01)

(58) Field of Classification Search
USPC .......................................................... 340/935
See application file for complete search history.

(56) References Cited

FOREIGN PATENT DOCUMENTS

DE 102014014249 3/2015
EP 0612641 8/1994

* cited by examiner

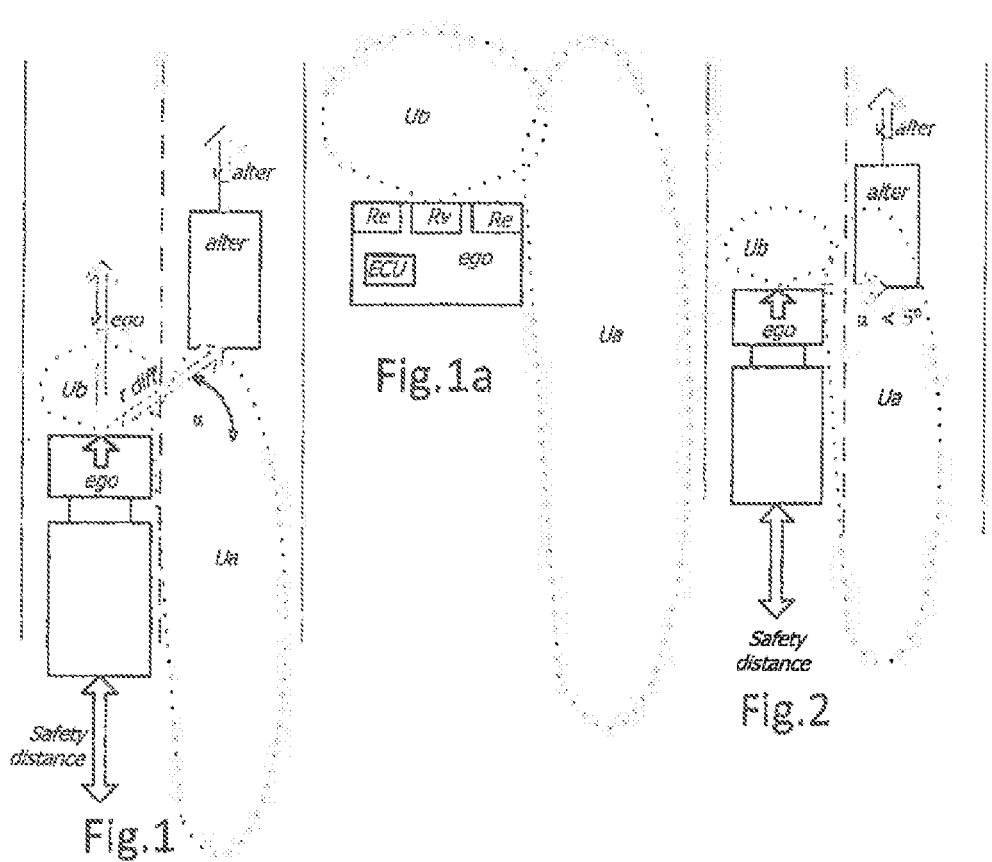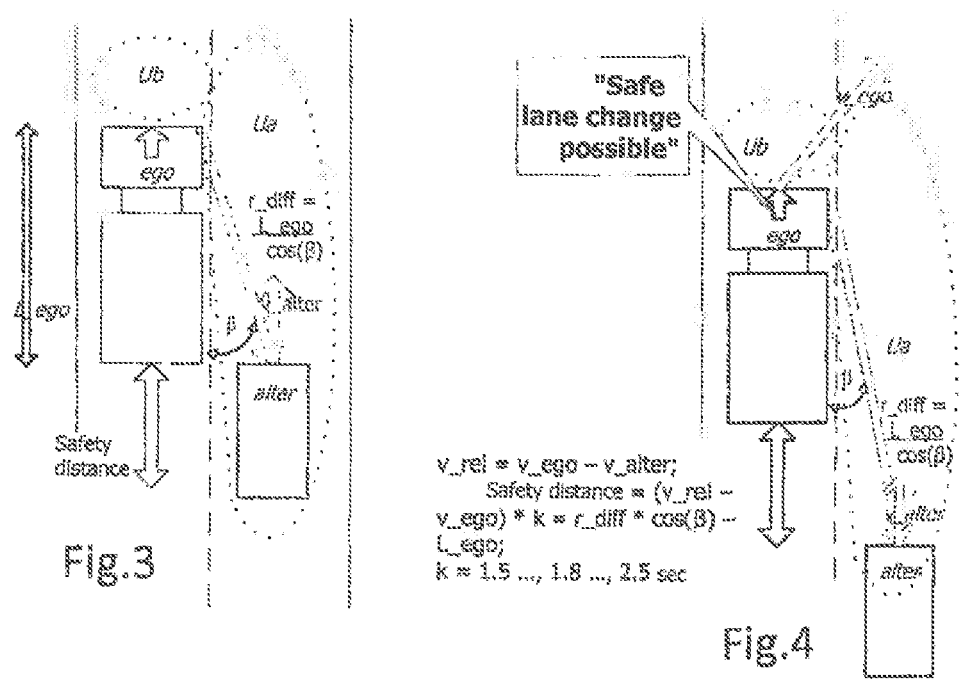

CONTROL SYSTEM AND METHOD FOR ASSISTING MOTOR VEHICLES IN SAFELY PULLING IN AFTER OVERTAKING

RELATED APPLICATIONS

This application corresponds to PCT/EP2018/057227, filed Apr. 1, 2016, which claims the benefit of German Application No. 10 2015 004 476.1, filed Apr. 7, 2015, the subject matter of which are incorporated herein by reference in their entirety.

BACKGROUND OF THE INVENTION

A control system and a method for assisting a motor vehicle in safely pulling in after overtaking is disclosed herein. This system and method is possible in motor vehicles, in particular in HGVs (heavy goods vehicles), in particular owing to the presence of ACC (autonomous/adaptive cruise control).

PRIOR ART

An ACC device, which monitors the distance from the vehicle ahead for the driver and adapts the speed of his own vehicle to the speed of a vehicle ahead, is described, for example, in EP-A-0 612 641. The question of a safe lane change from the fast lane (back) into the "slower" lane (that is to say, for example, from the left- into the right-hand lane in continental Europe and the USA) is not addressed therein.

Among HGV drivers, it is often usual that the driver of an overtaken HGV informs the driver of the overtaking HGV, by means of a signal (generally by flashing the headlamps), that he can safely pull back into the slower lane.

Daimler AG offers an active blind spot assistance system for its vehicles. Since nobody is able to see what is happening behind his back, rearview and exterior mirrors are provided in the vehicle. Nevertheless, an area always remains which cannot be covered even by looking in the mirrors: the blind spot. Every year, over 9500 serious traffic accidents occur in Germany because car drivers change lanes without paying attention to the following traffic or make mistakes when moving back into the right-hand lane again. Daimler AG's active blind spot assistance system is intended to assist car drivers in changing lanes safely. Close proximity radar sensors accommodated on both sides of the rear bumper monitor the area immediately adjacent to and behind the car. The active blind spot assistance system assists the driver in monitoring areas that are difficult to see, if the system detects another vehicle travelling in the parallel lane in the blind spot of the exterior mirror, a red warning signal appears in the exterior mirror to warn the oar driver, if the driver overlooks this warning and actuates the indicator in order to change lanes, the red warning signal begins to flash and a warning sound additionally sounds. In addition to warning the driver visually and acoustically, the active blind spot assistance system is also intended to help to avoid accidents by targeted autonomous application of the brakes. The system indicates in the exterior mirror when objects such as cars or motor bikes are in the blind spot and automatically takes countermeasures in the event of danger, for example when changing lanes.

Underlying Problem

In particular in the case of HGVs with relatively long trailers, it is difficult reliably to inform the driver of a vehicle that it is safe to pull into the adjacent lane in the context of an overtaking manoeuvre or a passing manoeuvre.

German Offenlegungsschrift 10 2005 013 669 A1 discloses a method and a device which, by means of sensors mounted on the rear of a motor vehicle, makes it easier for a driver of a motor vehicle to complete an overtaking manoeuvre. The sensors serve to determine the distance of a rear vehicle from the overtaking vehicle and/or to determine the difference in speed of a rear vehicle relative to the overtaking vehicle.

German patent specification 43 13 668 C1 discloses guiding assistance for a motor vehicle in changing lanes. Both the space behind and the space in front in the target lane are monitored by sensors present on the vehicle. When he wishes to change lanes, the driver of the vehicle is informed of the presence of a sufficient gap in the target lane by a display.

Proposed Solution

A control system which is adapted and intended for the application in a motor vehicle determines a time from which a safe lane-changing manoeuvre from a fast lane into an adjacent slower lane is possible on the basis of environmental data which are acquired by an environment sensor located at the front in the middle region of the motor vehicle and an environment sensor located laterally at the front in the corner region of the motor vehicle. For that purpose, the environment sensors are adapted to provide an electronic control unit of the control system with the environmental data representing the area laterally in front of and laterally adjacent to and laterally behind the vehicle. The control system is at least adapted and intended to determine driving data in the electronic control unit representing the driving situation of the own vehicle from transducers which are located in the own vehicle during a predetermined time period or continuously. The control system is at least adapted and intended to determine, on the basis of the driving data representing the driving situation of the own vehicle and on the characteristics of the driving situation/s of the other vehicle/s, whether a safety critical area laterally adjacent to and/or laterally behind the own vehicle is tree from the other vehicle/s and to output this optically, haptically and/or acoustically for the driver of the own vehicle. The control system is at least adapted and intended to determine in the electronic control unit the time from which the safe lane changing is possible on the basis of the driving data representing the driving situation of the own vehicle and on the characteristics of the driving situation/s of the other vehicle/s. The control system is at least adapted and intended to deem this time to have occurred when the electronic control unit determines that a rear edge of the own motor vehicle has passed a front edge of the other vehicle—that is to be overtaken—and a safety distance which is adapted to legal end/or physical conditions.

Further Embodiments and Advantageous Further Developments

The control system can be adapted and intended to acquire further environmental data in a further monitoring area in front of the vehicle by means of one or several environment sensor/s. The other vehicle/s to be overtaken can thus be detected in good time and the overtaking manoeuvre can be monitored continuously over time and evaluated in terms of its safe outcome.

Furthermore, situations can also occur in which the own vehicle is not actively overtaking another vehicle. This is the case, for example, when driving up to a vehicle that is to be overtaken on federal highways or motorways in which the joining acceleration lane merges into a new lane. Such a situation cannot be detected in every case by the one or several environment sensor/s of the own motor vehicle for the further monitoring area in front of the vehicle. The control system can therefore be adapted and intended additionally to evaluate the environmental data from the area laterally adjacent to and/or laterally behind the own motor vehicle, in order to determine a time from which a safe lane change of the own motor vehicle from a fast lane into an adjacent slower lane is possible.

The proposed solution is based on the finding that a more intensive evaluation of the driving environment of the own motor vehicle is required. The results of this evaluation of the driving environment are then also to be used when driving the own motor vehicle. In contrast to the known solutions, the present system is able to state directly the time at which it is actually safe to change lanes from a fast lane to an adjacent slower lane (=pulling-in manoeuvre). It is thereby not only possible to state that there is a vehicle in the blind spot of the own motor vehicle, but also to determine and signal the time at or from which the own motor vehicle can safely pull in in front of the other vehicle.

From the environmental data, the control system adapted and intended therefor determines driving data representing the driving situation of the own vehicle, and/or from the characteristics of the driving situation/s of the other vehicle/s, the control system adapted and intended therefor determines the respective speed, the location as a function of time, and the direction of travel of the own vehicle or of the other vehicle/s.

A control method which, in a motor vehicle, determines a time from which a safe lane-changing manoeuvre from a fast lane into an adjacent slower lane is possible on the basis of environmental data which are acquired by an environment sensor (Rv) located at the front in the middle region of the motor vehicle and an environment sensor located laterally at the front in the corner region of the motor vehicle comprises the following steps:

providing an electronic control unit in the own vehicle with environmental data representing the area laterally in front of and laterally adjacent to and laterally behind the vehicle by means of the environment sensors;

determining driving data representing the driving situation of the own vehicle from transducers located in the own vehicle during a predetermined time period or continuously, and providing the electronic control unit with that driving data;

detecting one or several other vehicles participating in traffic laterally in front of, laterally adjacent to and/or laterally behind the own vehicle by means of the environment sensors during a predetermined time period or continuously, in order to determine characteristics on the driving situation/s of the other vehicle/s; and determining by means of the electronic control unit, on the basis of the driving data representing the driving situation of the own vehicle and on the characteristics of the driving situation/s of the other vehicle/s, whether a safety critical area laterally adjacent to and/or laterally behind the own vehicle is free from the other vehicle/s and outputting this optically, haptically and/or acoustically for the driver of the own vehicle by means of the electronic control unit;

determining the time from which the safe lane changing is possible on the basis of the driving data representing the driving situation of the own vehicle and the characteristics of the driving situation/s of the other vehicle/s by means of the electronic control unit, and wherein this time is deemed to have occurred when the electronic control unit determines that a rear edge of the own motor vehicle has passed a front edge of the other vehicle and a safety distance which is adapted to legal and/or physical conditions.

BRIEF DESCRIPTION OF THE DRAWINGS

Further objectives, features, advantages and possible applications will become apparent from the following description of exemplary embodiments, which are not to be interpreted as limiting, with reference to the accompanying drawings. In the drawings, all the features which are described and/or depicted show the subject-matter disclosed herein on their own or in any desired combination, also independently of their grouping in the claims or their references. The dimensions and proportions of the components shown in the figures are not necessarily to scale, they can differ from those shown in embodiments for implementation:

FIG. 1 shows schematically a first driving situation in which an own vehicle in a left-hand lane is about to overtake another vehicle in the right-hand lane.

FIG. 1a shows schematically the own vehicle from FIG. 1 with its various environment sensors and monitoring areas.

FIG. 2 shows schematically a second driving situation in which the own vehicle in the left-hand lane is situated with its front edge approximately level with the rear edge of the other vehicle in the right-hand lane.

FIG. 3 shows schematically a third driving situation in which the own vehicle in the left-hand lane is situated with its rear edge approximately level with the front edge of the other vehicle in the right-hand lane.

FIG. 4 shows schematically a fourth driving situation in which the rear edge of the own vehicle in the left-hand lane is spaced apart from the front edge of the other vehicle in the right-hand lane approximately by a safety distance.

DETAILED DESCRIPTION OF THE DRAWINGS

The driving situation shown schematically in FIG. 1 is typical for an overtaking or passing manoeuvre. An own vehicle ego in a left-hand lane is here about to overtake another vehicle alter in the right-hand lane. To that end, the own vehicle ego is travelling at an own speed v_ego which is higher than the speed v_alter of the other vehicle alter.

The own vehicle ego has an electronic control unit ECU to which signals are fed, which acquires and processes environmental data and generates control or output signals. A radar sensor Re, not shown in further detail, which is situated laterally at the front in the corner region of the own vehicle ego has a first monitoring area Ua. A radar sensor Rv situated at the front in the middle region of the own vehicle ego has a second monitoring area Ub (see also FIG. 1a). The radar sensors Rv and Re provide the electronic control unit ECU with radar signals relating to the distance r_diff and the difference in speed v_diff between the own vehicle ego and the other vehicle alter, and the azimuth angle α or β.

In addition to the two radar sensors, the control system described herein, which is adapted and intended for use in a motor vehicle, may also have further environment sensors (video, ultrasound, lidar, etc.) for detecting the environment of the own vehicle ego. The electronic control unit ECU processes the environmental data acquired from one or several environment sensor/s (radar sensors Rv, Re) located at the motor vehicle in order to determine a time from which a safe lane-changing manoeuvre from a fast lane into an adjacent slower lane is possible. For that purpose, the environment sensors Rv, Re provide the electronic control unit ECU of the control system with the environmental data representing the area laterally in front of, laterally adjacent to and/or laterally behind the vehicle.

The environment sensors Rv, Re detect one or several other vehicles alter participating in traffic laterally in front of, laterally adjacent to and/or laterally behind the own motor vehicle ego for a predetermined time period, which covers an overtaking manoeuvre, for example, or continuously in order to determine characteristics on the driving situation/s of the other vehicle/s alter. These characteristics include, for example, the speed, the location as a function of time, the direction of travel of the other vehicle/s alter.

The electronic control unit ECU of the control system can at least be adapted and intended to determine driving data in the electronic control unit ECU representing the driving situation of the own motor vehicle ego from transducers which are located in the own vehicle ago during a predetermined time period, which covers the overtaking manoeuvre, for example, or continuously. These transducers can include, for example, the tachometer or the electronic control unit of the braking system (ABS, ESP), which delivers a signal representing the speed of the own motor vehicle ego to the electronic control unit ECU.

The electronic control unit ECU determines, on the basis of the driving data representing the driving situation of the own vehicle ego and on the characteristics of the driving situation/s of the other vehicle/s, whether a safety critical area laterally adjacent to and/or laterally behind the own vehicle ego is free from the other vehicle/s alter and outputs this optically, haptically and/or acoustically for the driver of the own vehicle ego. For that purpose, the electronic control unit ECU is adapted and intended to determine the time from which a safe lane change is possible from the own driving data and the characteristics of the other vehicle/s alter. That time is deemed to have occurred when the electronic control unit ECU determines that a rear edge of the own motor vehicle ego has passed a front edge of the other vehicle alter and a safety distance which is adapted to legal and/or physical conditions.

FIG. 2 shows schematically a second driving situation in which the own motor vehicle ego in the left-hand lane is situated with its front edge approximately level with the rear edge of the other vehicle alter in the right-hand lane. In the configuration shown, this state is recognized as being present when the absolute value of the azimuth angle α from the radar sensor Rv is recognized in the electronic control unit ECU as being less than or equal to a specific limit value α_lim:

$$|\alpha| <= \alpha\_lim$$

The limit value α_lim is determined in practical terms at a value of the order of magnitude of 5°. In the case of a lane width of approximately 3.5 meters, this corresponds to a distance, considered in the direction of travel, of the order of magnitude of 30 centimeters between the front edge of the own motor vehicle ego and the rear edge of the other motor vehicle alter. In this respect, the state shown in FIG. 2 can also be recognized when the absolute value of the distance d between the front edge of the own motor vehicle ego and the rear edge of the other motor vehicle alter is recognized in the electronic control unit ECU as being less than or equal to a specific limit value d_lim.

$$|d| <= d\_lim$$

In FIG. 3, the own motor vehicle ego is in the left-hand lane with its rear edge approximately level with the front edge of the other motor vehicle alter in the right-hand lane. In the configuration shown, this state is recognized as being present when the cos (β) of the azimuth angle β from the radar sensor Re multiplied by the distance r_diff from the other vehicle alter is recognized in the electronic control unit ECU as being equal to the length of the own motor vehicle L_ego entered into the electronic control unit ECU:

$$\cos(\beta) * r\_diff = L\_ego$$

In particular in the case of heavy goods vehicles, the trailers or towed vehicles of which can differ in length, the length of the own motor vehicle L_ego can be entered by corresponding data input in the cockpit of the towing vehicle. If there is an electronic connection between the towing vehicle and the trailer or towed vehicle, the length can be entered as a parameter into the electronic control unit ECU via the electronic connection.

FIG. 4 shows schematically a fourth driving situation in which the own motor vehicle ego in the left-hand lane is situated with its rear edge spaced apart from the front edge of the other motor vehicle alter in the right-hand land approximately by a safety distance.

In the configuration shown, this state is recognized as being present when the (absolute value of the) difference in the relative speed v_rel between the other vehicle alter and the own motor vehicle ego from the radar sensor Re and the speed v_ego of the own motor vehicle ego multiplied by a factor k is equal to the cos (β) of the azimuth angle β from the radar sensor Re multiplied by the distance r_diff from the other motor vehicle alter minus the length of the own motor vehicle L_ego. The factor k can be, for example, between 1.5 . . . , 1.8 . . . , 2.5 sec.:

$$v\_rel = v\_ego - v\_alter \rightarrow v\_alter = v\_ego - v\_rel;$$

$$\text{safety distance} = [(v\_rel - v\_ego)] * k = r\_diff * \cos(\beta) - L\_ego;$$

k=1.5 . . . , 1.8 . . . , 2.5 sec.

Numerical example: If the speed of the owe vehicle v_ego=90 km/h and the relative speed between the vehicles v_rel=18 km/h, then the speed of the other vehicle v_alter=72 km/h, which corresponds to 20 m/s. If 1.8 s is chosen as the factor k, this gives a safety distance of 36 m, that is to say the safety distance corresponds to the distance of half the tachometer display of the other vehicle.

When this state is reached, the message "Safe lane change possible" is signalled to the driver of the own motor vehicle. The message can be given to the driver of the own vehicle optically, haptically and/or acoustically.

Furthermore, situations can also occur in which the own motor vehicle ego is not actively overtaking another motor vehicle alter. For example, when driving up to the vehicle to be overtaken on federal highways or motorways in which the lateral acceleration lane merges into a new lane. Here too, the data of the environment sensors can be used to detect the situation laterally adjacent to the own vehicle ego in the above-described manner, in order to avoid a collision with the other motor vehicle alter joining the federal highway or motorway (expressway).

The above-described variants and the structural and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described variants. Combinations between all the individual implementations in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

The invention claimed is:

1. A control system which is adapted and intended for the application in an own motor vehicle, comprising an environment sensor (Re) located laterally at the front in the corner region of the own motor vehicle and having a monitoring area (Ua), and an environment sensor (Rv) located at the front in the middle region of the own motor vehicle and having a monitoring area (Ub), wherein the environment sensors (Rv, Re) are adapted to monitor the area laterally in front of and laterally adjacent to and laterally behind the own motor vehicle (ego) during a predetermined time period in order to determine a speed, a location as a function of time, and a direction of travel of another vehicle (alter) participating in traffic, wherein the control system is adapted to determine a time from which a safe lane-changing manoeuvre from a fast lane into an adjacent slower lane is possible on the basis of the environmental data acquired by the environment sensors (Rv, Re), wherein the environment sensors (Rv, Re) are adapted to provide an electronic control unit (ECU) of the control system with environmental data representing the area laterally in front of and laterally adjacent to and laterally behind the own motor vehicle during a predetermined time period, and wherein the control system is at least adapted and intended to determine driving data in the electronic control unit (ECU) representing a driving situation of the own motor vehicle (ego) from transducers which are located in the own motor vehicle (ego) during a predetermined time period or continuously;

detect the other vehicle (alter) participating in traffic laterally in front of, laterally adjacent to and/or laterally behind the own motor vehicle (ego) by means of the environment sensors during the predetermined time period in order to determine characteristics of the driving situation of the other vehicle (alter); and determine, on the basis of the driving data representing the driving situation of the own motor vehicle (ego) and on the characteristics of the driving situation of the other vehicle (alter), whether a safety critical area laterally adjacent to and/or laterally behind the own motor vehicle (ego) is free from the other vehicle (alter) and to output this optically, haptically and/or acoustically for the driver of the own motor vehicle (ego), wherein the control system is adapted and intended to determine in the electronic control unit (ECU) the time from which the safe lane changing is possible on the basis of the driving data representing the driving situation of the own motor vehicle (ego) and on the characteristics of the driving situation of the other vehicle (alter), and wherein this time is deemed to have occurred when the electronic control unit (ECU) determines that a rear edge of the own motor vehicle (ego) has passed a front edge of the other vehicle (alter) and a safety distance which is adapted to legal and/or physical conditions.

2. The control system as claimed in claim 1, which is adapted and intended to acquire further environmental data in a further monitoring area in front of the own motor vehicle (ego) by means of one or several environment sensor/s located at the own motor vehicle, in order to detect the other vehicle (alter) to be overtaken in good time and monitor the driving situation of the own motor vehicle (ego) and of the other vehicle (alter) continuously over time and evaluate it in terms of its safe outcome, with the aim of determining the time from which the safe lane-changing manoeuvre is possible.

3. The control system as claimed in claim 1, which is adapted and intended additionally to evaluate the environmental data from the area laterally adjacent to and/or laterally behind the own motor vehicle (ego) by means of one or several environment sensor/s located at the own motor vehicle, with the aim of determining the time from which the safe lane-changing manoeuvre is possible.

4. The control system as claimed in claim 1, wherein the monitoring area (Ua) of the environment sensor (Re) includes a blind spot of the own vehicle.

5. The control system as claimed in claim 1, wherein the environmental sensors simultaneously monitor the area laterally in front of and laterally adjacent to and laterally behind the own motor vehicle.

6. A control method which is based on environmental data acquired by an environment sensor (Re) located laterally at the front in the corner region of an own motor vehicle and having a monitoring area (Ua) and a second environment sensor (Rv) located in the middle region of the own motor vehicle and having a monitoring area (Ub), wherein the environment sensors (Rv, Re) monitor the area laterally in front of and laterally adjacent to and laterally behind the own motor vehicle (ego) during a predetermined time period in order to determine the speed, the location as a function of time and the direction of travel of another vehicle and wherein the control system determines a time from which a safe lane-changing manoeuvre from a fast lane into an adjacent slower lane is possible on the basis of the environmental data acquired by the environment sensors (Rv, Re), comprising the steps:

providing an electronic control unit (ECU) in the own motor vehicle (ego) with environmental data representing the area laterally in front of and laterally adjacent to and laterally behind the own motor vehicle by means of the environment sensors (Rv, Re), determining driving data representing the driving situation of the own motor vehicle (ego) from transducers which are located in the own motor vehicle (ego) during a predetermined time period or continuously, and providing the electronic control unit (ECU) with that driving data;

detecting the other vehicle (alter) participating in traffic laterally in front of, laterally adjacent to and/or laterally behind the own motor vehicle (ego) by means of the environment sensors during the predetermined time period in order to determine characteristics of the driving situation of the other vehicle (alter), and provide the electronic control unit (ECU) with those characteristics; and determining by means of the electronic control unit (ECU), on the basis of the driving data representing the driving situation of the own motor vehicle (ego) and on the characteristics of the driving situation of the other vehicle (alter), whether a safety critical area laterally adjacent to and/or laterally behind the own motor vehicle (ego) is free from the other vehicle (alter) and outputting this optically, haptically and/or acoustically for the driver of the own motor vehicle (ego), determining by means of the electronic control unit (ECU) the time from which the safe lane changing is possible on the basis of the driving data representing the driving situation of the own motor vehicle and on the characteristics of the driving situation of the other vehicle (alter), and wherein this time is deemed to have occurred when the electronic control unit (ECU) determines that a rear edge of the own motor vehicle (ego) has passed a front edge of the other vehicle (alter) and a safety distance which is adapted to legal and/or physical conditions.

7. The control method as claimed in claim 6, comprising the step of acquiring further environmental data in a further monitoring area in front of the own motor vehicle (ego) by means of one or several environment sensor/s located at the own motor vehicle, in order to detect the other vehicle (alter) to be overtaken in good time and monitor the driving situation of the own motor vehicle (ego) and of the other vehicle (alter) continuously over time and evaluate it in terms of its safe outcome, with the aim of determining the time from which the safe lane-changing manoeuvre is possible.

8. The control method as claimed in claim 6, comprising the step of additionally evaluating the environmental data from the area laterally adjacent to and/or laterally behind the own motor vehicle (ego) by means of one or several environment sensor/s located at the own motor vehicle, with the aim of determining the time from which the safe lane-changing manoeuvre is possible.

9. The control method as claimed in claim 6, further comprising detecting the other vehicle in a blind spot of the own vehicle within the monitoring area (Ua) of the environment sensor (Re).

10. The control method as claimed in claim 6, wherein the environmental sensors simultaneously monitor the area laterally in front of and laterally adjacent to and laterally behind the own motor vehicle.

11. A control method for an own motor vehicle for determining a time from which a safe lane-changing manoeuvre from a fast lane into an adjacent slow lane is possible, comprising the steps of:
monitoring an area around the own vehicle with a first environmental sensor located laterally at the front in the corner region of the own vehicle and a second environmental sensor located at the front in the middle region of the own vehicle, the first environmental sensor monitoring the area laterally adjacent to and laterally behind the own motor vehicle such that the first environmental sensor monitors a blind spot around the own vehicle, the second environmental sensor monitoring the area laterally in front of the own motor vehicle;

acquiring environmental data with the first and second environmental sensors during a predetermined time period in order to determine a speed, a location as a function of time, and a direction of travel of another vehicle participating in traffic in the area around the own vehicle to determine characteristics of the driving situation of the other vehicle;

providing the environmental data and the characteristics of the driving situation to an electronic control unit in the own vehicle;

determining driving data representing the driving situation of the own vehicle from transducers located in the own vehicle during the predetermined time period and providing the determined driving data to the electronic control unit;

determining with the electronic control unit based on the driving data of the own vehicle and the characteristics of the driving situation of the other vehicle whether a safety critical area laterally adjacent to and/or laterally behind the own vehicle is free from the other vehicle by calculating that a rear edge of the own motor vehicle is at least a predetermined distance from a front edge of the other vehicle indicating that the safe lane-changing manoeuvre is possible; and notifying the driver of the own vehicle that the safety critical area is free from the other vehicle.

12. The control method as claimed in claim 11, wherein the environmental sensors simultaneously monitor the area laterally in front of and laterally adjacent to and laterally behind the own motor vehicle.

* * * * *